US 6,748,346 B2

(12) United States Patent
Ujiie

(10) Patent No.: US 6,748,346 B2
(45) Date of Patent: Jun. 8, 2004

(54) INTERFERENCE VERIFYING DEVICE AND METHOD FOR VERIFYING INTERFERENCE BETWEEN PARTS WITHIN A DEVICE

(75) Inventor: Kazuyuki Ujiie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 09/748,369

(22) Filed: Dec. 27, 2000

(65) Prior Publication Data

US 2004/0088144 A1 May 6, 2004

Related U.S. Application Data

(63) Continuation of application No. PCT/JP99/00339, filed on Jan. 27, 1999.

(30) Foreign Application Priority Data

Jul. 14, 1998 (JP) .......................................... 10-198452

(51) Int. Cl.[7] .............................................. G06F 17/50
(52) U.S. Cl. ................................ 703/1; 703/7; 700/57; 700/90
(58) Field of Search ...................... 703/1, 2, 7; 700/57, 700/255, 90, 97, 103; 219/121.64

(56) References Cited

U.S. PATENT DOCUMENTS 4,901,253 A * 2/1990 Iwano et al. ................ 364/522
5,343,385 A * 8/1994 Joskowicz et al. ...... 364/167.01
5,380,978 A * 1/1995 Pryor ..................... 219/121.64
5,442,168 A * 8/1995 Gurner et al. ............... 250/221
5,452,238 A * 9/1995 Kramer et al. .............. 364/578
5,908,283 A * 6/1999 Huang et al. ................ 414/801
5,910,894 A * 6/1999 Pryor ..................... 364/468.01

FOREIGN PATENT DOCUMENTS

| JP | 6-325136 | 11/1994 | |
| JP | 07-200536 | 11/1994 | ........... G06F/15/60 |
| JP | 07200536 | 8/1995 | ........... G06F/17/10 |
| JP | 08044777 | 2/1996 | ........... G06F/17/50 |
| JP | 8-96023 | 4/1996 | |
| JP | 8-329283 | 12/1996 | |
| JP | 09311883 | 12/1997 | ........... G06F/17/50 |

* cited by examiner

Primary Examiner—Samuel Broda, esq.
Assistant Examiner—T. Phan
(74) Attorney, Agent, or Firm—Staas & Halsey LLP

(57) ABSTRACT

The changed state of a shape of a transformable element of each part is preregistered to a library in an assembly simulation. When two parts collide with each other, the changed state of the element is selected according to an interference condition such as a material, a direction in which force is applied, etc., and the interference between parts is verified based on the selected shape after being changed.

16 Claims, 25 Drawing Sheets

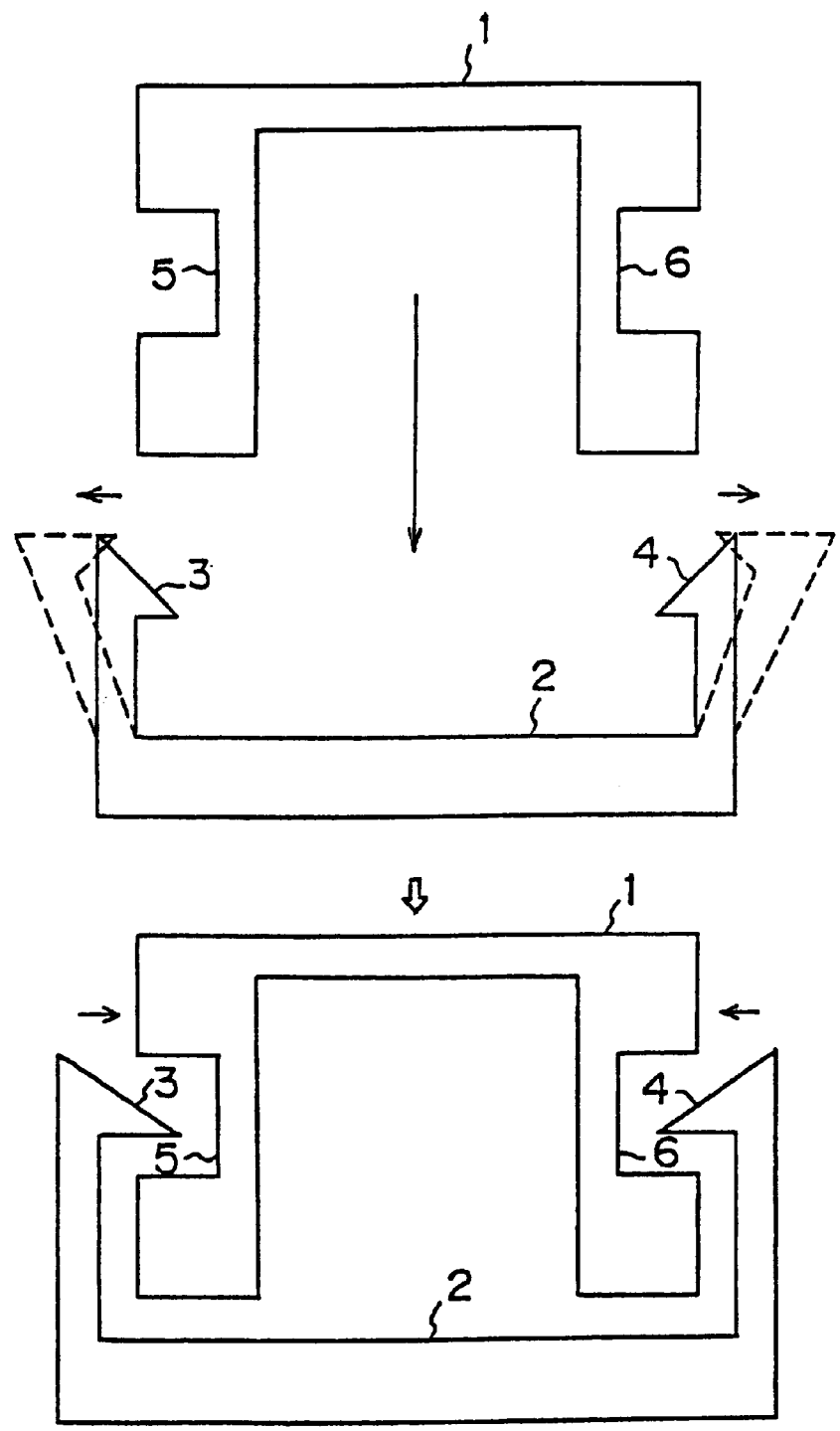
F I G. 1

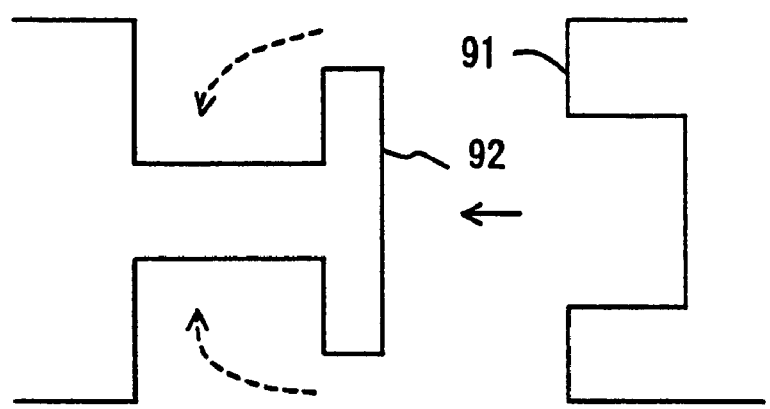
F I G. 1 9

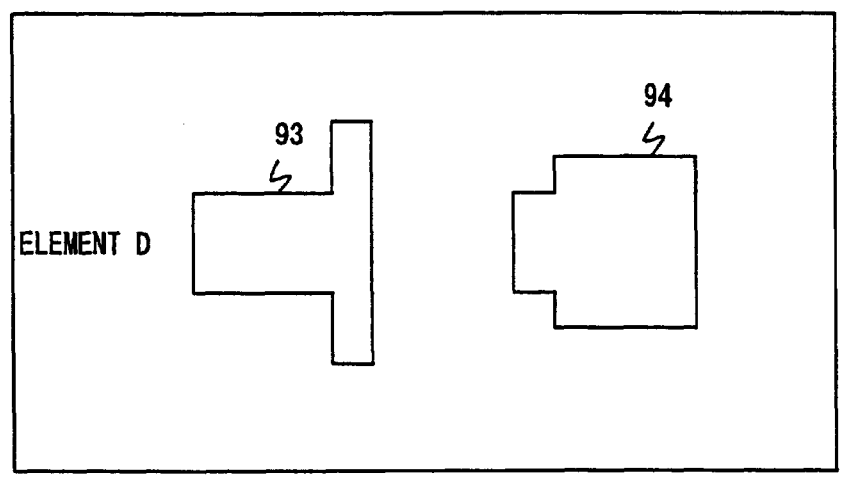
F I G. 2 1

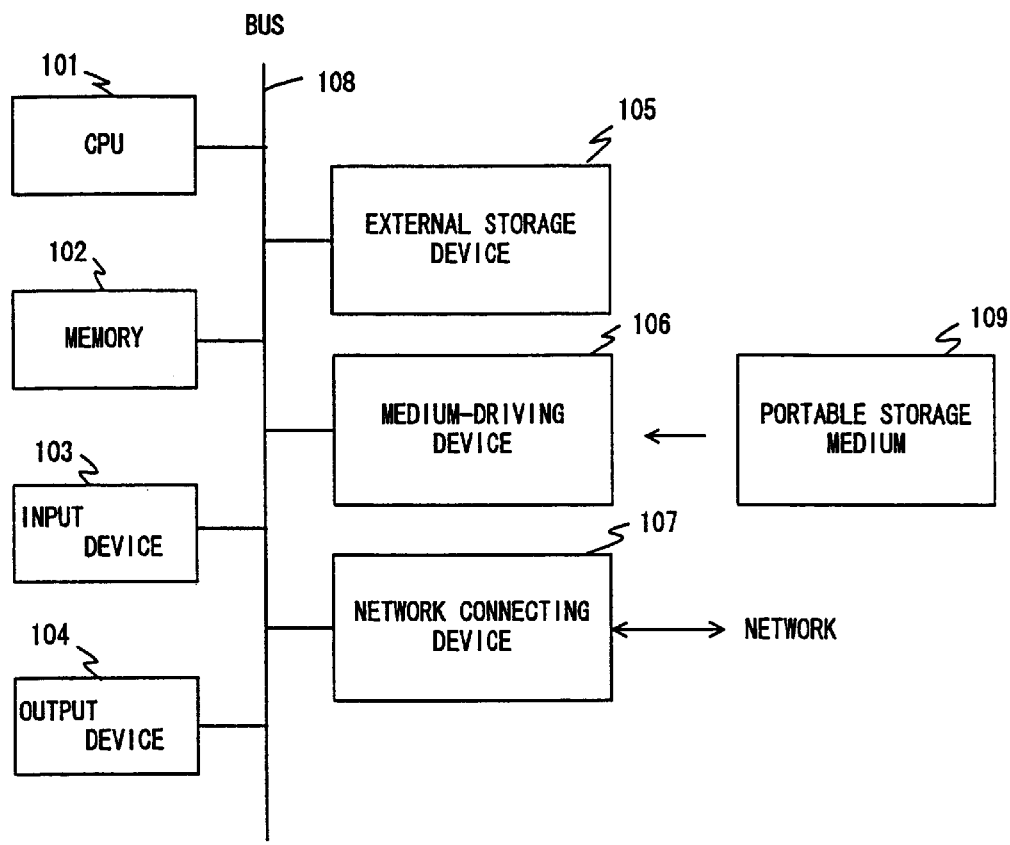
F I G. 2 3

INTERFERENCE VERIFYING DEVICE AND METHOD FOR VERIFYING INTERFERENCE BETWEEN PARTS WITHIN A DEVICE

CROSS REFERENCE TO RELATED APPLICATION

This application is a continuation of International PCT Application No. PCT/JP99/00339 filed on Jan. 27, 1999.

BACKGROUND OF THE INVENTION

1. Field of the Invention

The present invention relates to technology for verifying interference between objects, and more particularly to an interference verifying device for verifying interference between parts, which occurs at an assembly, in a design stage of a device composed of a plurality of parts, and a method thereof.

2. Description of the Related Art

For an actual assembly of a device such as an electronic device, a method using elasticity of parts may be sometimes adopted at an assembly of two parts. At this time, these two parts are combined by applying force to one of them, and changing the shapes of projecting portions (elements) of the other. Assume that parts 1 and 2 are combined as shown in FIG. 1. In this case, the part 1 is inserted into the part 2 by pressing the part 1 to the part 2, and by simultaneously changing the shapes of the projecting portions 3 and 4 of the part 2. Consequently, the projecting portions 3 and 4 are fit into the cavities 5 and 6 of the part 1, and the parts 1 and 2 are restored to the states before their parts are changed.

For such an assembly of parts, interference checking is made by using an interference checking capability of a three-dimensional CAD (Computer-Aided Design) system in the state where the parts are assembled, and whether or not respective parts can be assembled is verified. Since the projecting portions 3 and 4 fit into the cavities 5 and 6 of the part 1 as a result of the verification, an interference state is not detected and it is verified that the parts can be assembled.

Additionally, with a recent three-dimensional CAD system, not the above described interference checking in an assembly state, but dynamic interference checking which also covers an assembly route is becoming possible with the improvement of the throughput of a processor. In the meantime, when the above described assembly of parts is made, the shape of one of the two parts is temporarily changed and restored to its original shape, so that the two parts are combined. Accordingly, it is desirable that a verification result indicating that an assembly can be made even in an assembly simulation with a three-dimensional CAD which can make dynamic interference checking.

However, since a conventional system for verifying interference between parts makes interference verification by recognizing each part to be rigid, it cannot verify whether or not an assembly can be made also in consideration of a changed shape of a part. Accordingly, even if an assembly is actually feasible as shown in FIG. 1, the parts 1 and 2 are recognized to interfere with each other. As a result, the verification only results in the disability of the assembly.

In the meantime, also a method for combining assembly simulation with part structure analysis maybe considered. With this method, a structure analysis calculation of projecting portions in touch is made when parts get into touch. Because the numerical calculation of the structure analysis is added to the calculation of the distance between parts in touch with this method, the processing speed slows down.

As described above, the conventional assembly simulation may sometimes evaluate an originally feasible assembly to be impossible, or requires a large amount of calculation time in order to obtain an accurate verification result.

SUMMARY OF THE INVENTION

An object of the present invention is to provide an interference verifying device and method for efficiently checking whether or not an assembly can be made by performing interference verification in consideration of a part shape change at a design stage of a device composed of a plurality of parts.

According to the first aspect of the present invention, the interference verifying device comprises a simulation unit, a storing unit, a deformation unit and a verification unit, and makes interference verification between parts in a device composed of a plurality of parts.

The simulation unit simulates a positional relationship among the plurality of parts by using shape information of the plurality of parts. The storing unit stores changed shape information of at least one part of the plurality of parts. The deformation unit changes a shape of the at least one part by using the changed shape information. The verification unit verifies an interference state among the plurality of parts based on a changed shape.

According to the second aspect of the present invention, the interference verifying device comprises a simulation unit, a storing unit, a deformation unit and a verification unit.

The simulation unit simulates a positional information of first and second objects by using shape information of the first and second objects. The storing unit stores changed shape information of the first object. The deformation unit changes a shape of the first object by using the changed shape information, when the first object comes in contact with the second object. The verification unit verifies an interference state between the first and the second objects based on a changed shape.

BRIEF DESCRIPTION OF DRAWINGS

FIG. 1 exemplifies an assembly using elasticity;

FIG. 19 shows an assembly route using plastic deformation;

FIG. 21 shows a fifth library;

FIG. 23 is a block diagram showing the configuration of an information processing device.

DESCRIPTION OF PREFERRED EMBODIMENTS

The preferred embodiments of the present invention are described in detail below with reference to the drawings.

Figure 2A:
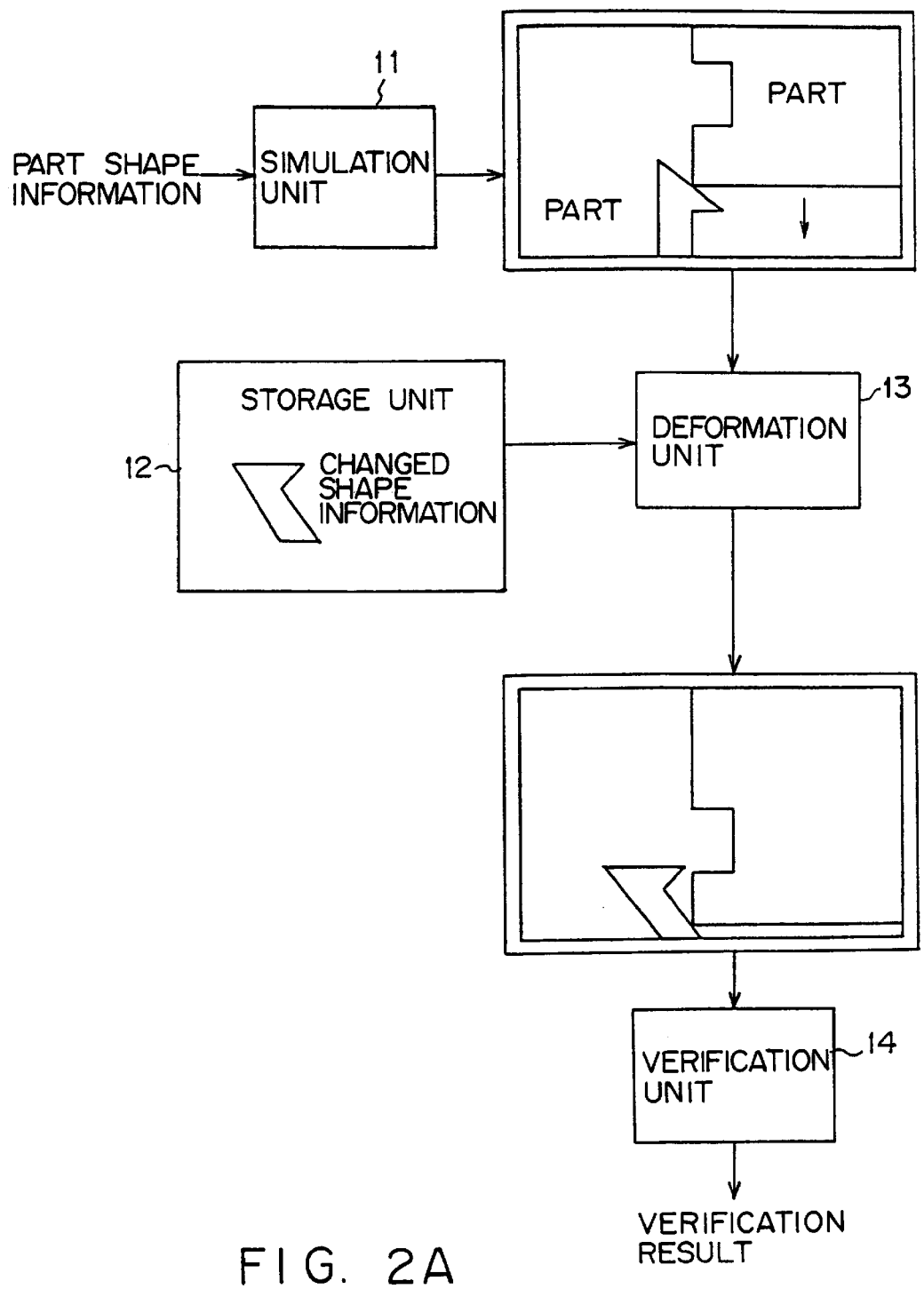
FIG. 2A is a block diagram showing the principle of an interference verifying device according to the present invention.

FIG. 2A shows the principle of an interference verifying device according to the present invention. The interference verifying device shown in FIG. 2A comprises a simulation unit 11, a storage unit 12, a deformation unit 13, and a verification unit 14. This interference verifying device is intended to verify the interference between a plurality of parts configuring a device.

The simulation unit 11 simulates the positional relationship between the plurality of parts by using the shape information of the parts. The storage unit 12 stores the changed shape information of at least one of the parts.

The deformation unit 13 changes the shape of at least one of the parts by using the changed shape information, when at least the one of the parts comes in contact with another. The verification unit 14 verifies the interference state between the parts based on the changed shape.

The shape information of a part corresponds to, for example, three-dimensional model data generated by a three-dimensional CAD system, and represents the shape of the part. The simulation unit 11 represents the positional relationship between parts in a three-dimensional space by using the shape information of the respective parts. The changed shape information of a part corresponds to the data representing the shape of the part when being changed by a factor such as externally applied force, etc., and is generated beforehand and stored in the storage unit 12.

If the changed shape information of at least one of two parts is stored in the storage unit 12 when one of the parts moves and comes in contact with the other during the simulation performed by the simulation unit 11, the deformation unit 13 changes the shape of the corresponding part with the changed shape information.

As a result, the relationship between these two parts may sometimes change and no interference may occur. The verification unit 14 checks the interference between the part whose shape has been changed and the other part, and outputs its result.

With such an interference verifying device, even if two parts get in touch during device assembly simulation, etc., the simulation can be continued by eliminating the interference between the parts with the shape change of either of the parts. If the part whose shape has been changed does not interfere with the other, an assembly can be determined to be feasible. Accordingly, an accuracy of the determination of whether or not an assembly is feasible at a design stage can be improved.

Furthermore, the changed shape information is generated and stored beforehand, which eliminates the need for performing a complicated structure analysis calculation every contact of parts, thereby quickly performing interference verification.

Figure 2B:
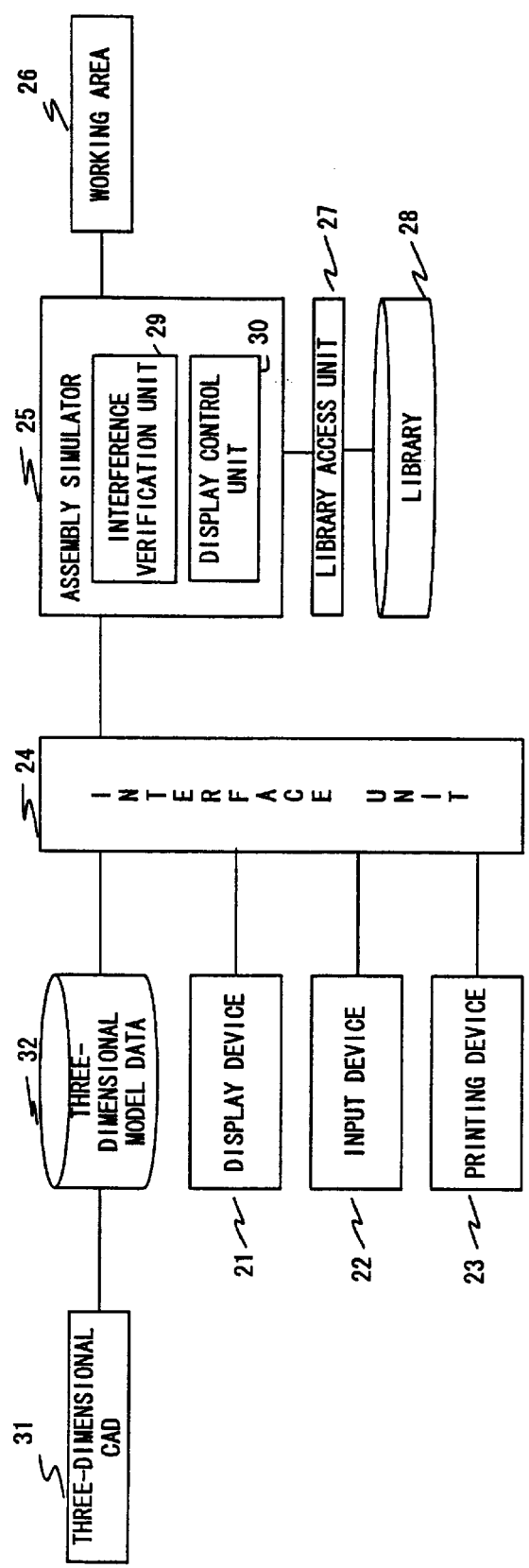
FIG. 2B is a block diagram showing the configuration of the interference verifying device.

For example, the simulation unit 11 shown in FIG. 2A corresponds to an assembly simulator 25 which is shown in FIG. 2B and will be described later, the storage unit 12 shown in FIG. 2A corresponds to a library shown in FIG. 2B, the deformation unit 13 shown in FIG. 2A corresponds to an interference verification unit 29 and a display control unit 30, which are shown in FIG. 2B, and the verification unit 14 shown in FIG. 2A corresponds to an interference verification unit 29 shown in FIG. 2B.

An interference verifying device according to the present invention comprises the following capabilities:

(1) Capability for determining whether or not two parts include a transformable element such as an elastic material, when they collide with each other.

(2) Capability for managing a changed shape state of a transformable element as a library.

(3) Capability for selecting a changed shape state of a transformable element from a library according to a direction to which force is applied.

(4) Capability for verifying the interference between parts based on a selected shape after being changed.

(5) Capability for restoring an element whose shape is changed to its original state, and for representing a final assembly state.

If the shape of a transformable element is preregistered to a library as described above, the changed shape of a part at an assembly can be easily simulated and interference verification can be performed with the changed shape without the structure analysis that consumes time. Accordingly, it becomes possible to quickly and accurately check whether or not parts including a transformable element can be assembled. If accurate assembly checking is made at a design stage, a problem can be detected earlier. Namely, a problem can be detected at an early stage, which prevents a design from being redone at a design stage turning back from a prototyping stage.

FIG. 2B is a block diagram showing the configuration of an interference verifying device according to the present invention. The interference verifying device shown in FIG. 2B is configured, for example, by a computer, and comprises a display device 21, an input device 22, a printing device 23, an interface unit 24, an assembly simulator 25, a working area 26, a library access unit 27, and a library 28.

The assembly simulator 25 includes an interference verification unit 29 and a display control unit 30, and performs necessary processing by using the working area 26 within a memory. The assembly simulator 25, the interference verification unit 29, and the display control unit 30 correspond to the software components described by a program.

A designer designs parts configuring a device (product) with a three-dimensional CAD system 31, and generates three-dimensional model data 32 representing the shapes of the parts or the positional relationships. The assembly simulator 25 reads the three-dimensional model data 32 via the interface unit 24, and performs simulation for assembling the parts in a specified order or assembly route.

Here, the assembly route indicates, for example, the route on which the parts to be assembled move from current positions to target positions in a product assembly process, as explained in the Japanese Patent Laid-Open Publication No. 9-311883 (Device for Designing a Mechanical Device/Assisting a Manufacturing Process).

The interference verification unit 29 checks whether or not two parts include a transformable element when they collide with each other in an assembly simulation. If a part includes such an element, the shape of the part after being changed is extracted from the library 28 via the library accessing unit 27, and is replaced with the original shape. Then, the interference between the parts is verified based on the shape after being changed.

The display controlling unit 30 displays an assembly state of a product at each stage in an assembly simulation on the screen of the display device 21 via the interface unit 24. If a part is changed according to the information of the library 28, the state of the part after being combined with another part is displayed after the shape of the part after being changed is displayed.

The input device 22 is used for inputting a user instruction or information. The printing device 23 is used for outputting information such as an assembly state of a product, etc. A user may sometimes be identical/unidentical to a designer.

Figure 3:
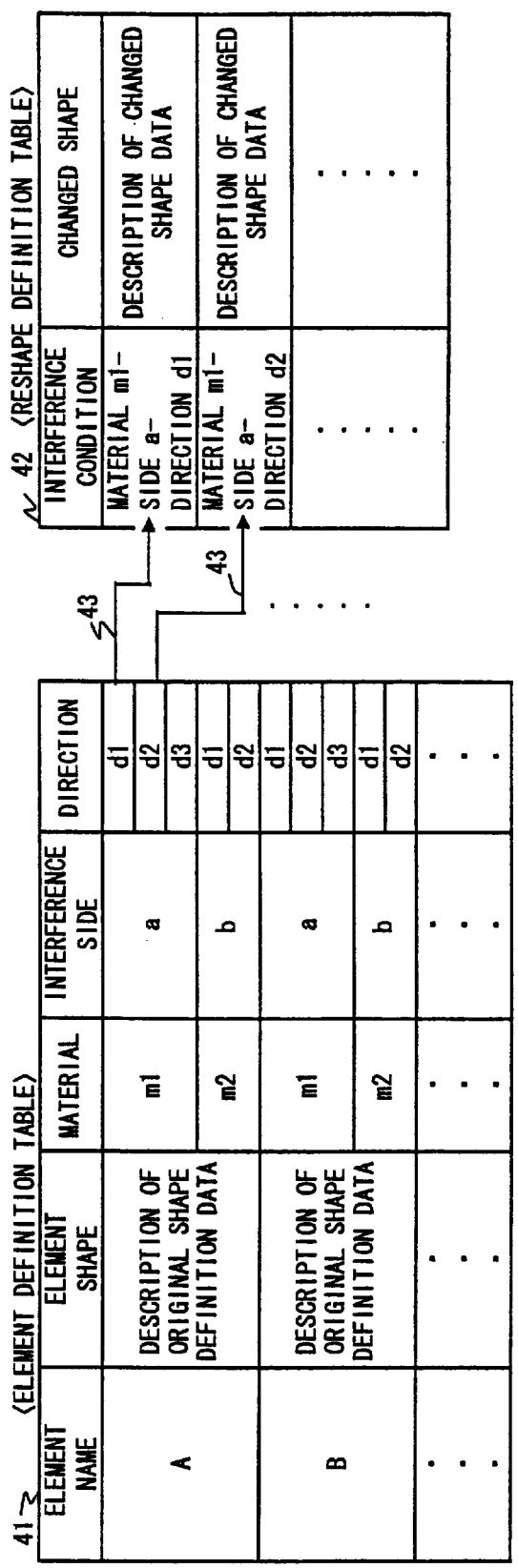
FIG. 3 shows the structure of a library.

FIG. 3 exemplifies the configuration of the library 28 used for verifying interference. The library shown in FIG. 3 is composed of an element definition table 41 and a changed shape definition table 42.

Element names included in the element definition table 41 indicate the identification information of a transformable element among elements representing a portion of respective parts included in the three-dimensional model data 32. Element shape describe shape definition data representing the shapes of the respective elements when being designed (before being changed). Materials indicate the identification information of materials of the respective elements. Interference faces represent the identification information of faces with which a different part maid interfere when being assembled. Directions represent the direction to which force is applied, and include a corresponding pointer 43 to an entry in the changed shape definition table 42.

Interference conditions within the changed shape definition table 42 represent a corresponding material, interference face, and directional identification information within the element definition table 41. Changed shapes describe the shapes after respective elements are changed in shape. With such a configuration, changed shape data can be changed according to a combination of materials, interference faces, and directions. Here, a difference between materials corresponds to a difference between the degrees of elasticity of elements.

For an element which is not registered to the element definition table 41 and an element whose corresponding changed shape data is not stored in the changed shape definition table 42 despite being registered, their shapes are defined not changed even if interference occurs.

Figure 4:
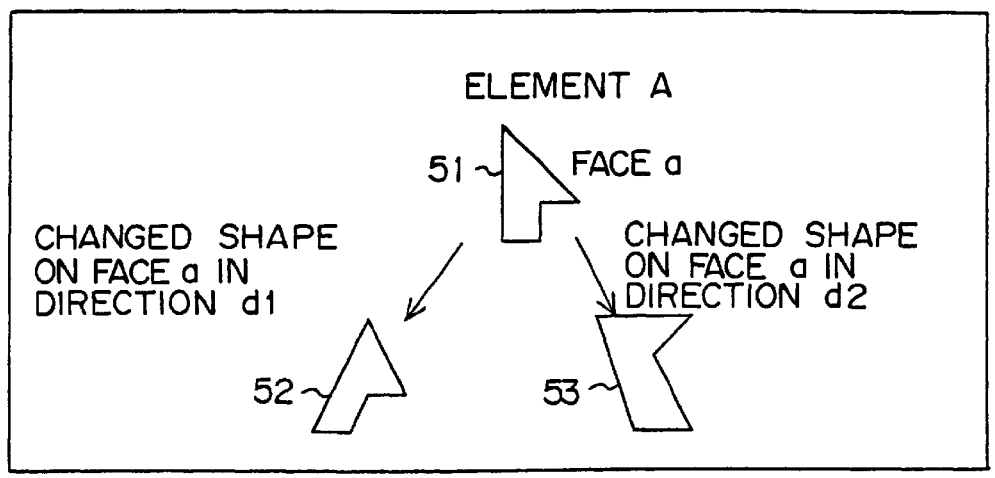
FIG. 4 shows a first library.

By way of example, for the projecting portion 3 of the part 2, which is shown in FIG. 1, information like the one shown in FIG. 4 is stored in a library under conditions such as an interference face and a direction. In FIG. 4, an element name A and shape definition data 51 are stored in the element definition table 41, while changed shape data 52 and 53 are stored in the changed shape definition table 42.

Figure 5:
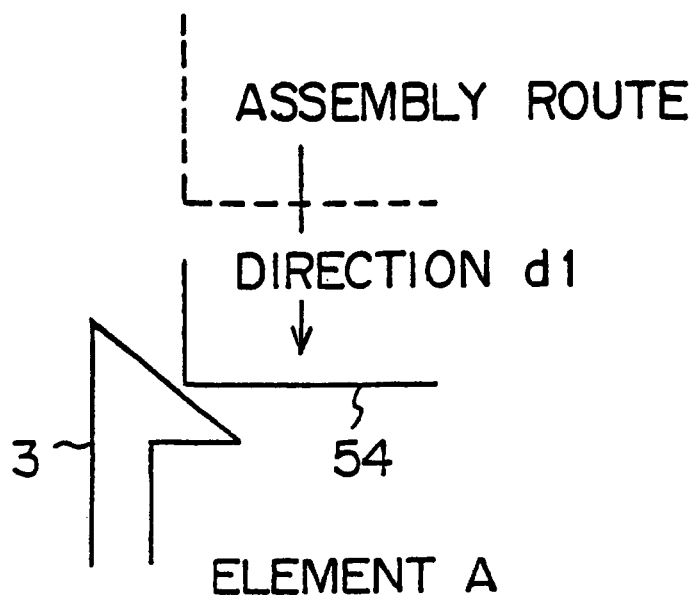
FIG. 5 shows a first direction.
Figure 6:
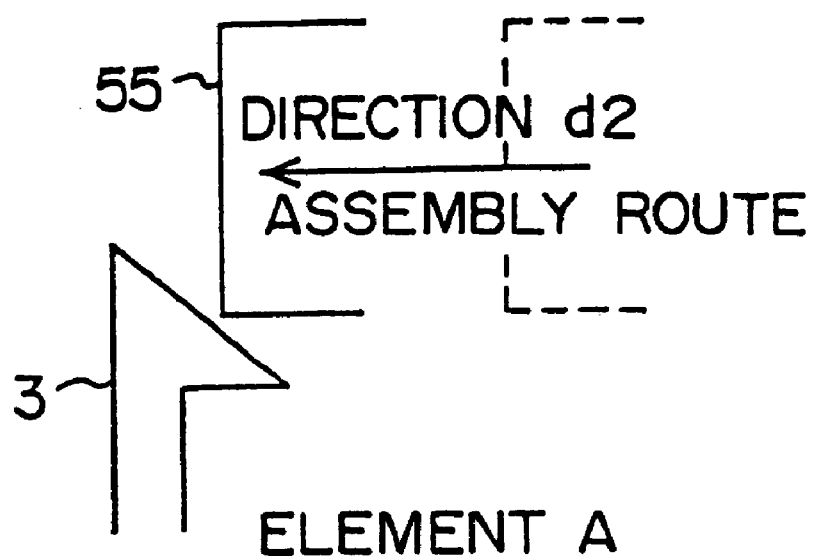
FIG. 6 shows a second direction.

The changed shape data 52 represents the shape after being changed by a force that the projection portion 3 receives from another part 54 when the part 54 moves in a direction d1 along an assembly route and comes in contact with a face a of the projecting portion 3, as shown in FIG. 5. In the meantime, the changed shape data 53 represents the shape after being changed by the force that the projecting portion 3 receives from another part 55 when the part 54 moves in a direction d2 along an assembly route and comes in contact with the face a of the projecting portion 3, as shown in FIG. 6.

As described above, different changed shapes are defined every interference face and every direction of an assembly route, so that a changed shape can be selected according to an actual assembly direction when interference is detected and more flexible interference verification can be made.

Figure 7:
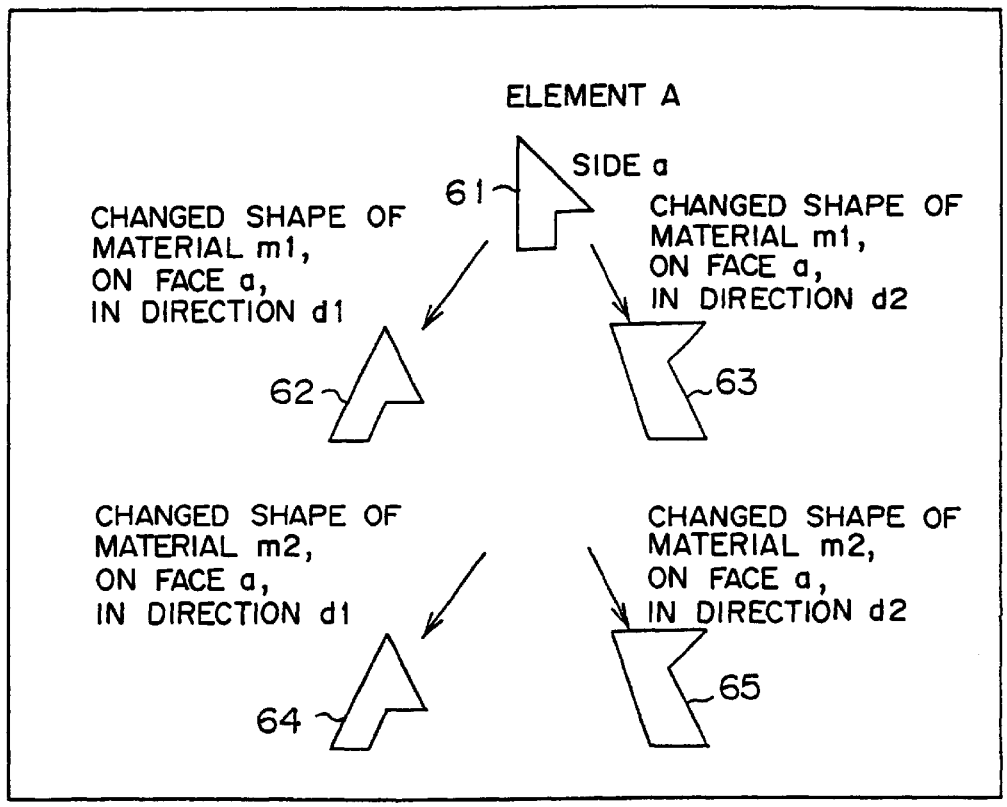
FIG. 7 shows a second library.

Furthermore, if interference verification is made in consideration of also the material of the projecting portion 3, information like the one shown in FIG. 7 is stored in a library under interference conditions such as an interference face, a direction, and a material. In FIG. 7, the element name A and the shape definition data 61 are stored in the element definition table 41, while the changed shape data 62, 63, 64, and 65 are stored in the changed shape definition table 42.

The changed shape data 62 represents the changed shape when the material of the element A is m1, the direction of the assembly route is d1, and the interference face is a. The changed shape data 63 represents the changed shape when the material of the element A is m1, the direction of the assembly route is d2, and the interference face is a. The changed shape data 64 represents the changed shape when the material of the element A is m2, the direction of the assembly route is d1, and the interference face is a. The changed shape data 65 represents the changed shape when the material of the element A is m2, the direction of the assembly route is d2, and the interference face is a.

As described above, a different shape is defined every material, every interference face, and every assembly route direction, so that a changed shape can be selected according to the direction of an actual assembly and the material of an interference part when interference is detected and more flexible interference verification can be made.

Figure 8:
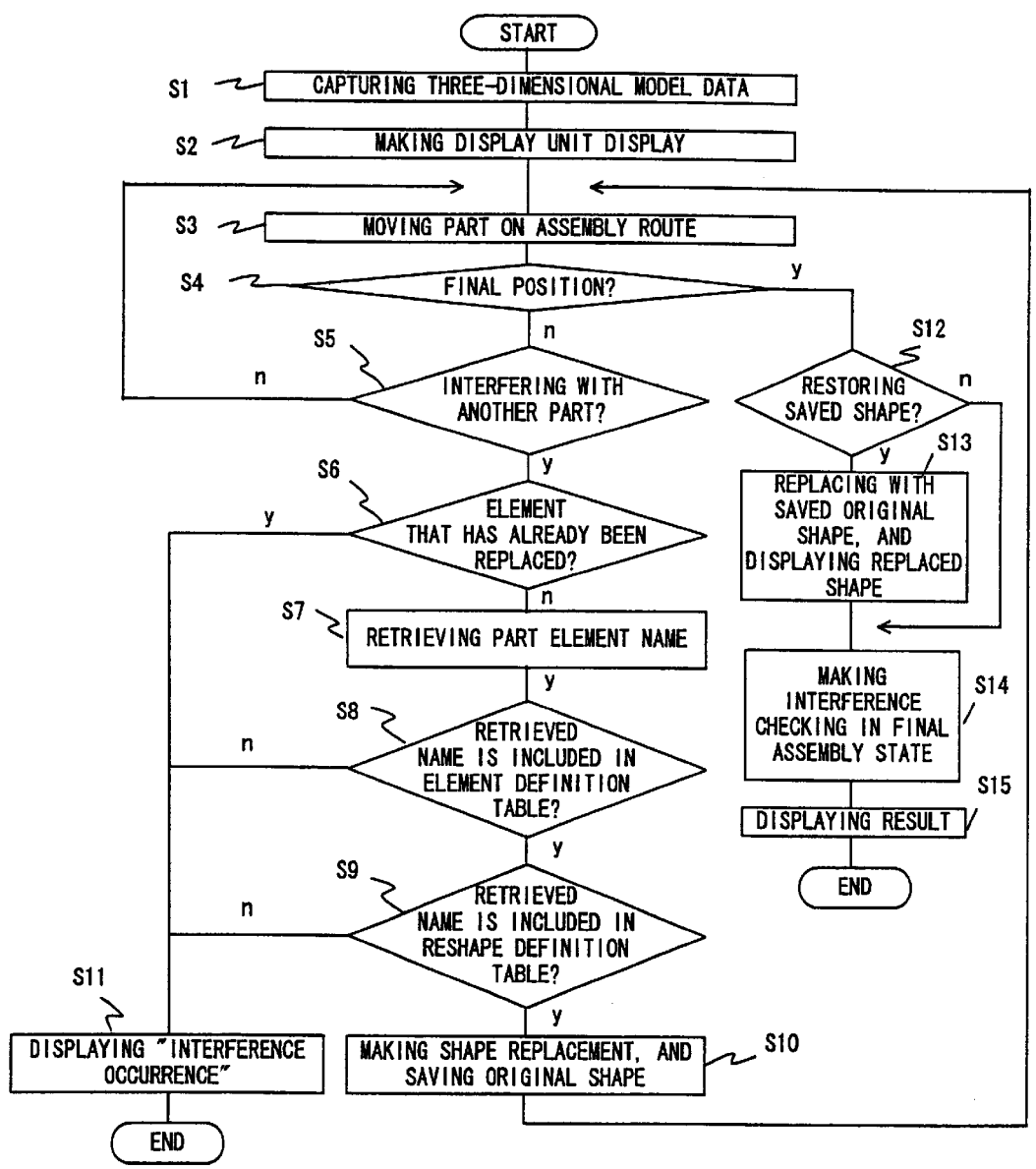
FIG. 8 is a flowchart showing a first interference verifying process.

Provided next is the explanation about the details of the operations performed by the interference verifying device shown in FIG. 2B. First, single stage interference verification for changing a shape once when interference occurs is described. FIG. 8 is a flowchart showing a single stage interference verification process.

First of all, an assembly simulator 25 reads the three-dimensional data 32 of a group of parts to be assembly-checked into the working area 26 via the interface unit 24 (step S1), and the display controlling unit 30 makes the display device 21 display the initial states of respective parts (step S2).

Next, a user selects an assembly target part by using the input device 22 such as a mouse, etc. and specifies an assembly route to the final position of the part. The assembly simulator 25 determines whether or not the selected part reaches the final position (step S4) while moving the selected part along the specified route (step S3).

If the selected position does not reach the final position, the interference verification unit 29 determines whether or not interference (contact) with a different part occurs while moving (step S5). If the interference with the different part is detected, an element of the part of an interference partner has been replaced with the shape after being changed (step S6).

If the interference partner is not changed, the library 28 is searched by using the library accessing unit 27, and determines whether or not the element is registered as an element permitting transformation (step S7). Here the elements names within the element definition table 41 are examined, and it is determined whether or not the element of the interference partner is registered (step S8).

If the element is registered to the element definition table 41, the material, the interference face, and the interference direction of the element are selected according to the interference state, and an access is made to the changed shape definition table 42 by using the pointer 43. Then, it is determined whether or not the changed shape corresponding to the selected interference condition is registered (step S9).

If the changed shape is registered to the changed shape definition table 42, the display controlling unit 30 replaces the original shape of the element of the interference partner with the changed shape in the working area 26, and displays the shape after being changed (step S10). Then, the original shape is saved to a save area within the working area 26. Thereafter, the assembly simulator 25 repeats the process in and after step S3. Even if interference with a different part does not occur in step 5, the process in and after step S3 is repeated.

For example, if the part 54 comes in contact with the projecting portion 3 along the assembly route shown in FIG. 5, the library shown in FIG. 4 is retrieved by using the element name A of the projecting portion 3 as a key, and the changed shape 52 corresponding to the actual interference face a and the actual direction d1 is selected. The original shape 51 that is firstly read is replaced with the changed shape 52. The changed shape 52 is then displayed, while the original shape 51 is saved.

Furthermore, if the material of the projecting portion 3 is m1 and the library shown in FIG. 7 is used, the changed shape 62 corresponding to the actual material m1, the actual interference face a, and the actual direction d1 is selected. The original shape 61 that is firstly read is replaced with the changed shape 62. The changed shape 62 is then displayed, while the original shape 61 is saved.

If the element of the part of the interference partner is replaced with the shape after being changed in step S6, the interference verification unit 29 recognizes that the element no more changes in shape. The display controlling unit 30 makes the display device 21 display the information of interference occurrence via the interface unit 24 (step S11), and terminates the process.

If the element of the interference partner is not registered to the element definition table 41 in step S8, and also if the changed shape is not registered to the changed shape definition table 42 in step S9, the element is recognized not to change in shape. Therefore, the information of interference occurrence is displayed (step S11), and the process is terminated.

In step S4, the interference verification unit 29 inquires of the user whether or not the original shape saved to the save area is reproduced when the selected part reaches the final position (step S12). When the user instructs reproduction, the changed shape is replaced with the original shape, and the display controlling unit 30 displays the original shape (step S13)

Thereafter, the interference verification unit 29 makes interference checking in the final assembly state by using the original shape (step S14). The display controlling unit 30 displays the result of the checking (step S15), and terminates the process. If interference is not detected in the final assembly state, the result of the determination indicating that the assembly along the specified assembly route is feasible is displayed. If the user does not instruct the reproduction in step S12, the process in and after step S14 is performed by using the changed shape.

Figure 9:
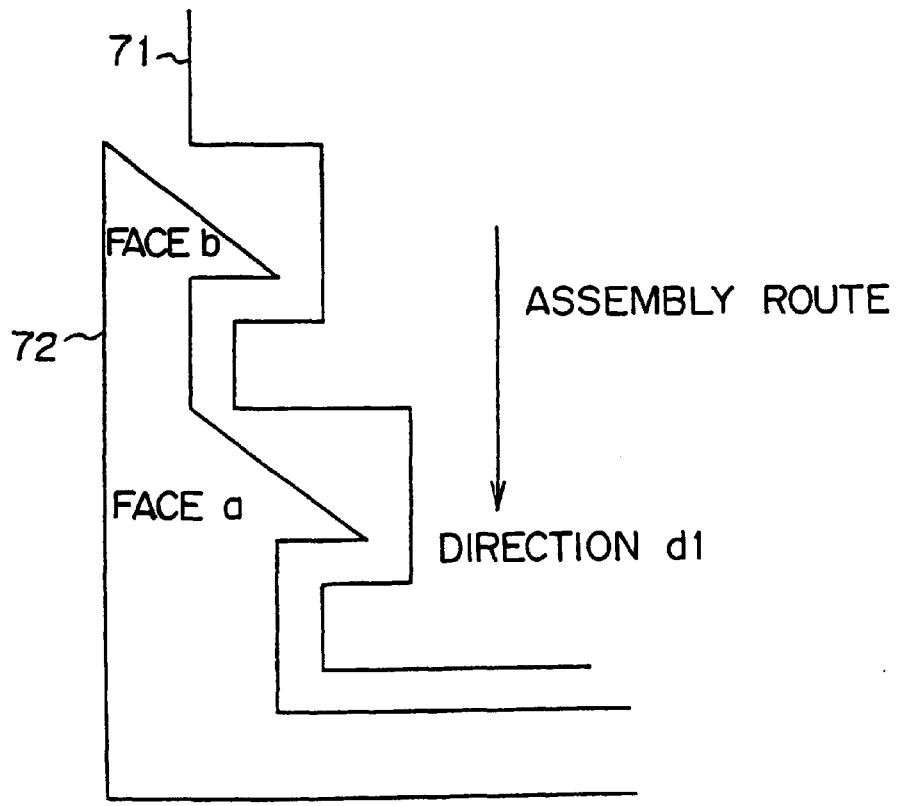
FIG. 9 shows an assembly route on which interference at multiple stages occur.
Figure 10:
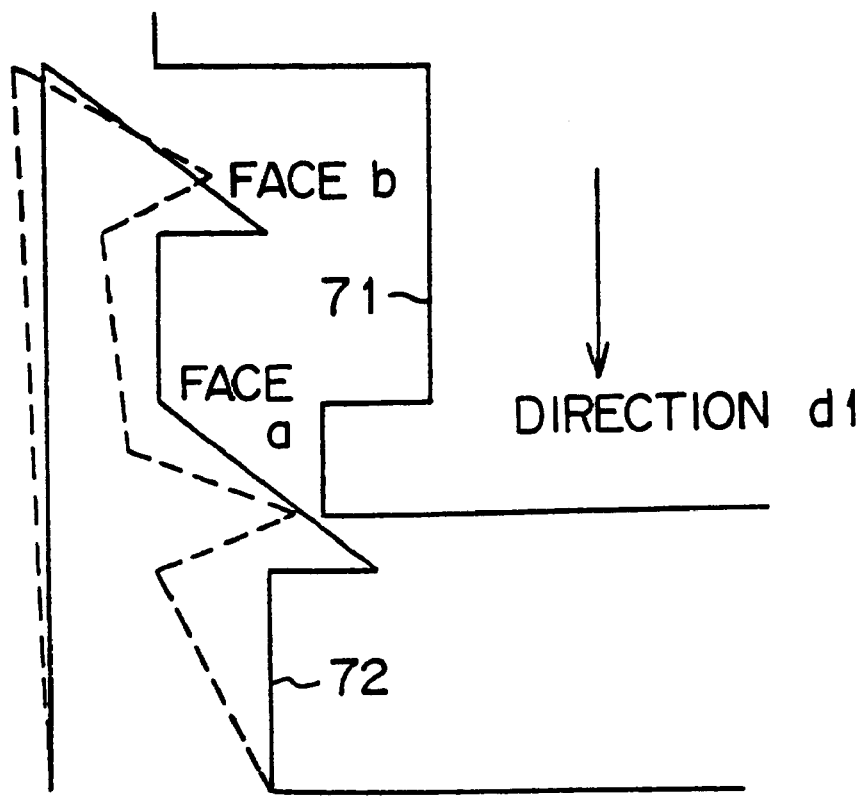
FIG. 10 shows the interference with a first side.
Figure 11:
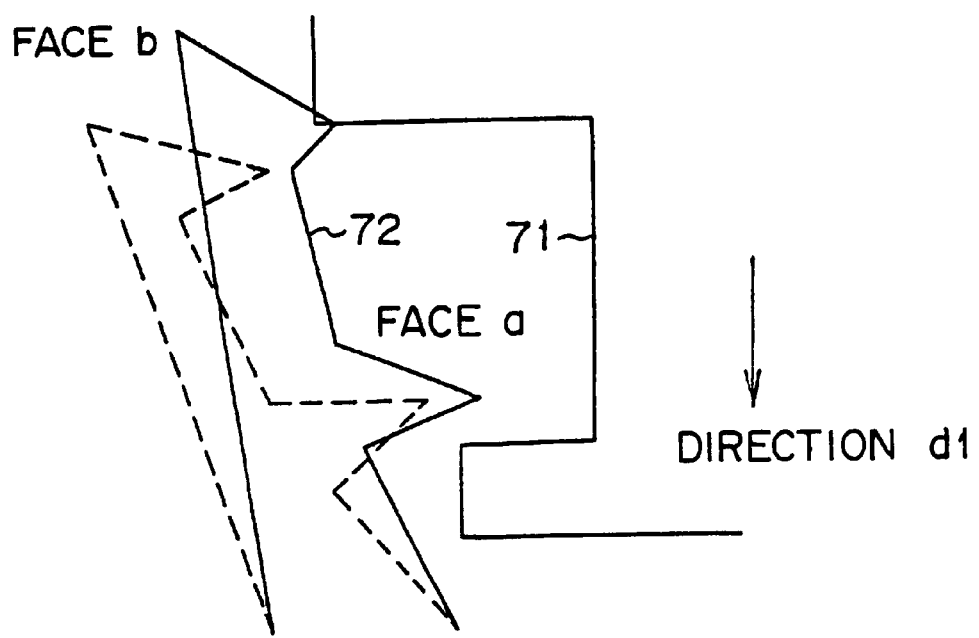
FIG. 11 shows the interference with a second side.

Provided next is the explanation about multi-stage interference verification for changing a shape two or more times when interference occurs. FIG. 9 exemplifies an assembly route on which interference occurs twice until the final position. When a part 71 is moved along the assembly route in a direction d1, the interference between two faces a and b of the projecting portion 72 of a different part, and the part 71 occurs. As shown in FIG. 10, the part 71 interferes with the face a. After the projecting portion 72 is changed, the part 71 interferes with the face b and the projecting portion 72 further changes in shape, as shown in FIG. 11.

Figure 12:
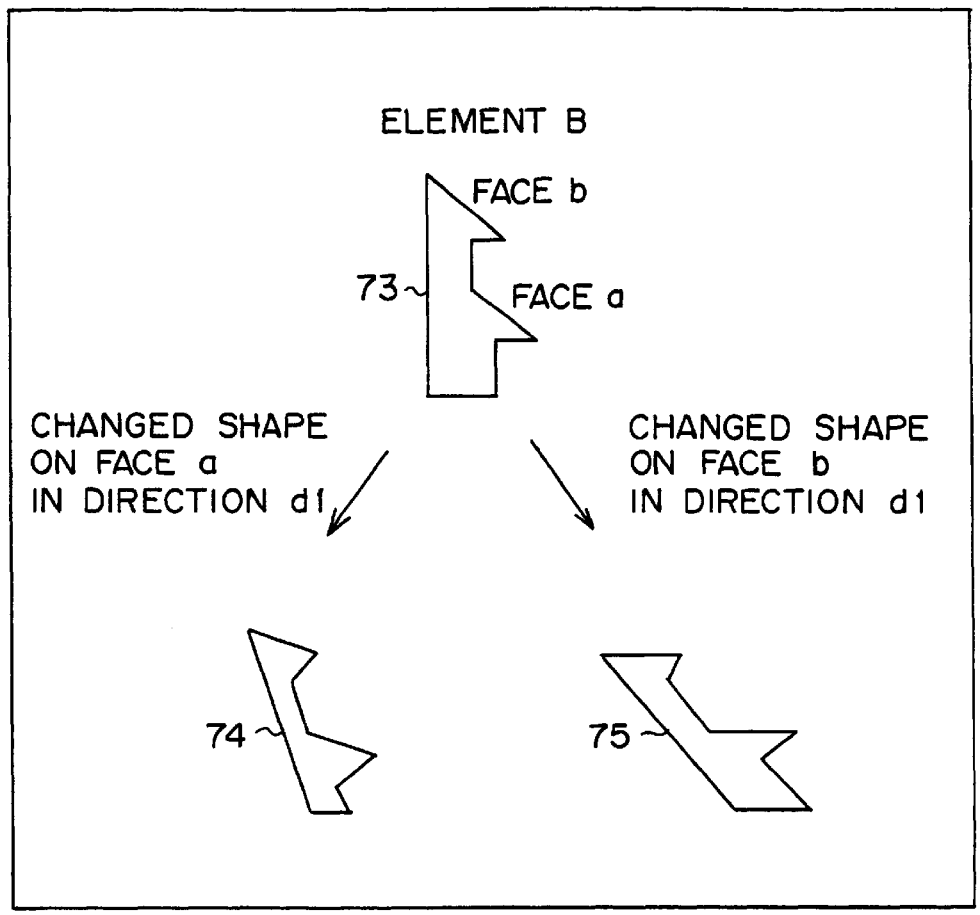
FIG. 12 shows a third library.

In this case, the information shown in FIG. 12 are stored in the library under the condition such as an interference face and direction. In FIG. 12, the element name B and the shape definition data 73 are stored in the element definition table 41. The changed shape data 74 and 75 are stored in the changed shape definition table 42. The changed shape data 75 represents the shape after being changed by the force that the projecting portion 72 receives from the part 71 when the different part 71 moves on an assembly route in the direction d1 and comes in contact with the face b of the projecting portion 72, as shown in FIG. 10.

Figure 13:
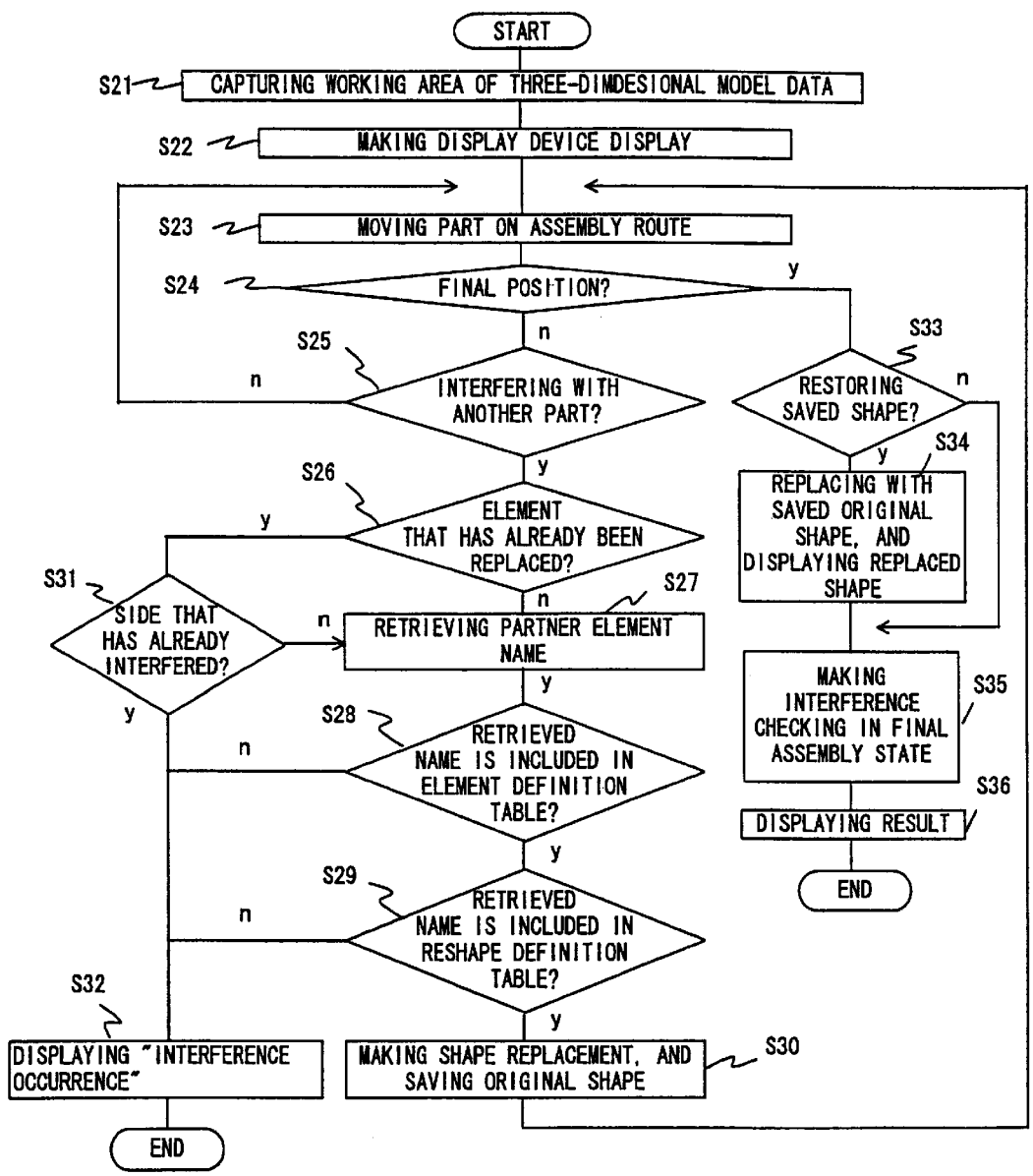
FIG. 13 is a flowchart showing a second interference verifying process.

FIG. 13 is a flowchart showing the multi-stage interference verifying process. In this figure, the operations performed in steps S21 through S30 and steps S32 through S36 are similar to those shown in FIG. 8. Step S31 corresponds to the operation which is newly added.

If the element of the part of the interference partner is replaced with the shape after being changed in step S26, the interference verification unit 29 determines whether or not a current interference face is the face which has already interfered (step S31). If the current interference face is the face which has already interfered, this element is determined not to be changed in shape any more and the operation of step S32 is performed. If the current interference face is the face which has not yet interfered, this element is determined to have a possibility of being further changed in shape. As a result, the operations in and after step S27 are performed and a library is retrieved.

For example, if the part 71 comes in contact with the face a of the projecting portion 72 on the assembly route shown in FIG. 9, the library shown in FIG. 12 is retrieved by using the element name B of the projecting portion 72 as a key, and the changed shape 74 corresponding to the interference face a and direction d1 is selected. The original shape 73 is then replaced with the changed shape 74. The changed shape 74 is then displayed, and the original shape 73 is saved.

Thereafter, when the part 71 comes in contact with the face b of the projecting unit 72, the library shown in FIG. 12 is again retrieved and the changed shape 75 corresponding to the interference face b and the direction d1 is selected. Then, the currently displayed changed shape 74 is replaced with the changed shape 75, so that the latter shape 75 is displayed. Thereafter, if the original shape is reproduced instep S34, the original shape 73is used.

Since interference occurs on two faces on this assembly route, two-stage interference verification is made. If interference occurs on N faces, N-stage interference verification is made with similar procedures.

The above described assembly example assumes the case where shapes of parts are changed with their elasticity. In the meantime, the interference verification process according to this embodiment can be also applied to other arbitrary shape change processes.

For example, if a part is recognized to be rigid, a predetermined abbreviated shape is preregistered to the library instead of the shape changed by elasticity, thereby making similar assembly checking. In this case, the interference verification unit 29 changes the shape of the interference partner by using an abbreviated shape when interference occurs, and makes interference checking by reverting it to its original shape in the final assembly state.

Figure 14:
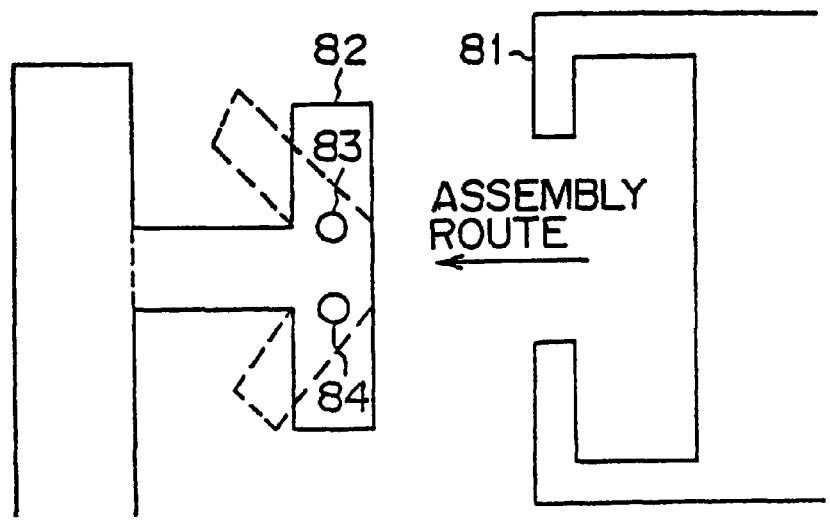
FIG. 14 shows a route on which rigid parts are assembled.
Figure 15:
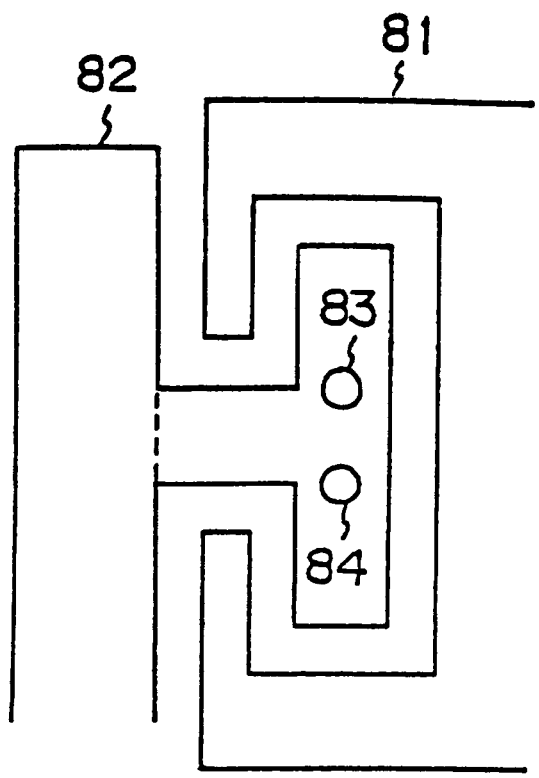
FIG. 15 shows a final assembly state.

FIG. 14 exemplifies an assembly route on which rigid parts are combined. When a part 81 is inserted into a projecting portion 82 along this assembly route, the interference between these parts occurs. Actually, however, spring mechanisms 83 and 84 are included in the projecting portion 82, ad the part 82 can be bent at these positions.

When the part 81 is moved to the final position, the bent portions spring back to its original positions, so that the part 81 and the projecting portion 82 fit into each other.

Figure 16:
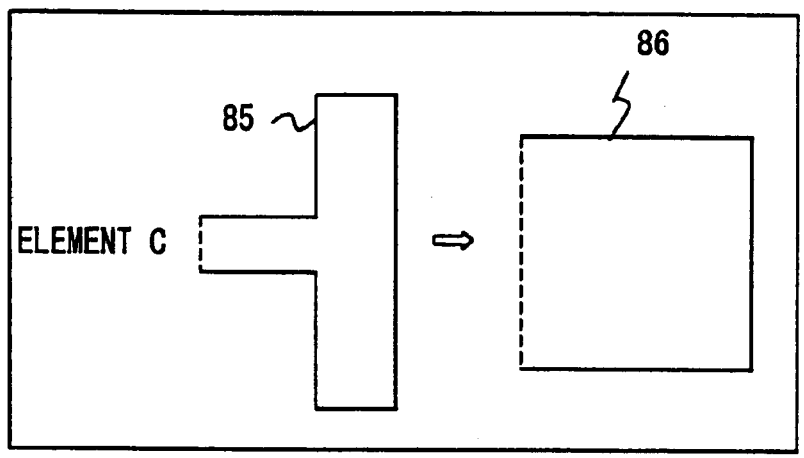
FIG. 16 shows a fourth library.

For such a projecting portion 82, the information shown in FIG. 16 is stored in a library. In FIG. 16, an element name C and shape definition data 85 are stored in the element definition table 41, while the changed shape data 86 is stored in the changed shape definition table 42. This changed shape data 86 represents the abbreviated shape of the projecting portion 82.

Figure 17:
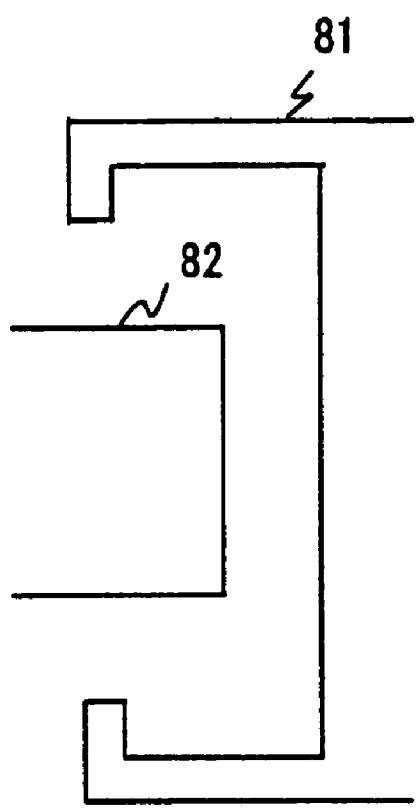
FIG. 17 shows an abbreviated shape.
Figure 18:
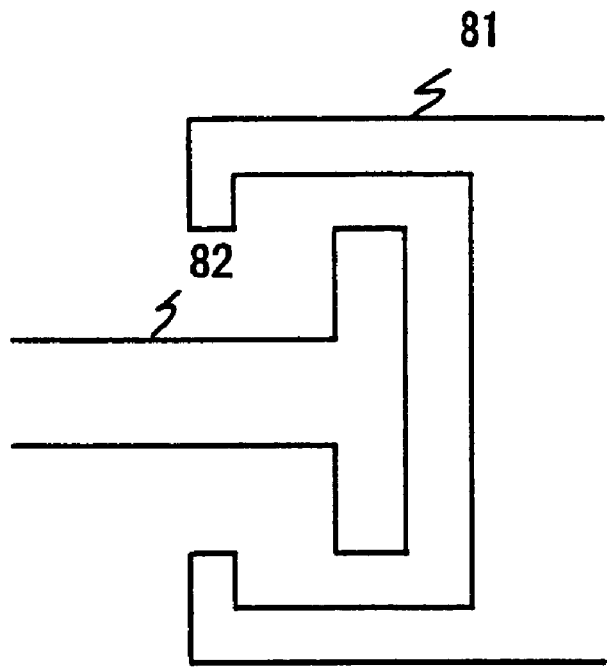
FIG. 18 shows an original shape.

When the other part 81 moves along the assembly route and comes in contact with the projecting portion 82 as shown in FIG. 14, the projecting portion 82 is changed from the original shape to the abbreviated shape and the interference verification is continued as shown in FIG. 17. Then, the projecting portion 82 is restored from the abbreviated shape to the original shape as shown in FIG. 18, so that the interference checking is made.

If a part is made of a plastic material, and plastic deformation occurs while being assembled, a predetermined shape after plastic deformation is preregistered instead of the shape changed with elasticity, whereby similar assembly checking is made. In this case, the interference verification unit 29 changes the shape of an interference partner by using the shape after plastic deformation when interference occurs, restores the partner to its original shape and makes interference checking in the final assembly state.

FIG. 19 exemplifies an assembly route on which parts are combined by using plastic deformation. When a part 91 is attached on a projecting portion 92 along this assembly route, interference between the part 91 and the projecting portion 92 occurs. Actually, however, the projecting portion 92 is designed to be changed in shape according to plastic deformation and combined with the part 91 when being assembled.

For such a projecting portion 92, the information shown in FIG. 21 is stored in a library. In FIG. 21, an element name D and shape definition data 93 are stored in the element definition table 41, while changed shape data is stored in the changed shape definition table 42. The changed shape data 94 represents the shape of the projecting portion 92 after plastic deformation.

Figure 20:
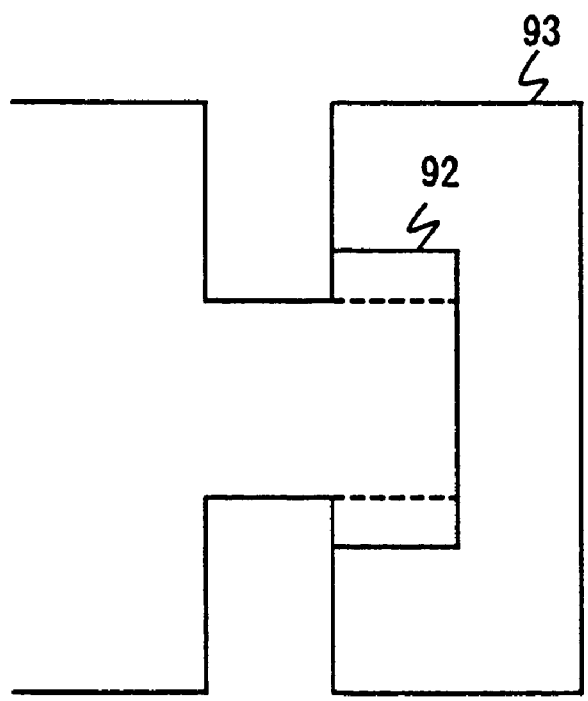
FIG. 20 shows plastic deformation.

When the other part 91 moves on the assembly route and comes in contact with the projecting portion 92 as shown in FIG. 19, the projecting portion 92 is changed from the original shape to the shape after plastic deformation, so that interference verification is continued. In this case, the changed shape is kept and the original shape is not reproduced even in the final assembly state as shown in FIG. 20.

In the above described preferred embodiments, the method for generating changed shape data to be registered to the library 28 is arbitrary. For example, any one of the following methods can be adopted.

Figure 22:
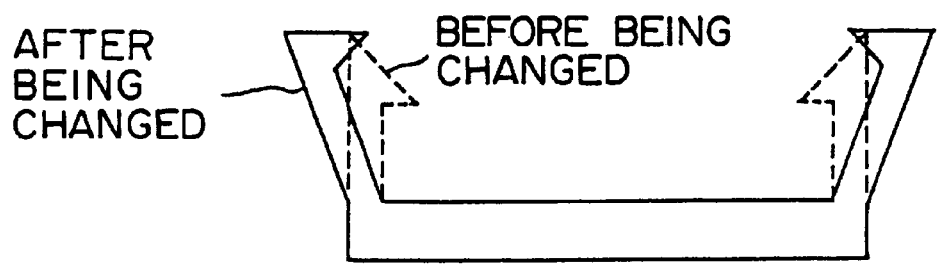
FIG. 22 shows the result of structure analysis.

(1) Calculating the shape when force is applied to each face of a designed part with a structural analysis program, and using the data representing the obtained shape as changed shape data. FIG. 22 exemplifies the changed shape obtained with the structural analysis. In FIG. 22, a broken line indicates the shape before being changed, while a solid line indicates the shape after being changed.

(2) If a changed shape is empirically estimated, or if a changed shape is predetermined, the data is used as the changed shape data unchanged.

Additionally, in the above described preferred embodiments, as an elastic material, for example, rubber, plastic, etc. can be raised. As a rigid material, for example, metal, ceramic, etc. can be raised. As a plastic material, for example, plastic can be raised. With the identification information of materials of the element definition table 41 shown in FIG. 3, the distinctions between these materials can be made, thereby registering respectively corresponding changed shapes.

Additionally, the element definition table 41 specifies corresponding changed shaped data by using a combination of a material, an interference face, and a direction as an interference condition. However, other conditions such as the size of force applied to an interference face, the moving speed of a part, etc. may be used as interference conditions. Normally, the number of parameters used as interference conditions may be arbitrary.

With the interference verification process shown in FIG. 8 or 13, the process is continued by changing the shape of the element of an interference partner of a moved part. Alternatively, the process may be continued by changing the shape of the element of the moved part. In this case, the element of the moved part is retrieved in the library 28, and the corresponding changed shape is extracted, so that the process for making a replacement with the original shape is performed. Whichever of two parts in touch to change may be specified by the user or by the system with a predetermined algorithm. Also an algorithm for changing the shapes of both of the parts may be considered.

Furthermore, the interference verification process according to the present invention is applied not only to the assembly simulation of a device, but also to interference checking between any objects using a three-dimensional model. For example, if a device composed of a plurality of parts is disassembled on a predetermined disassembly route, whether or not the disassembly is feasible can be checked by making similar interference verification. Here, the disassembly route indicates the route on which a part to be removed moves from a current position to a target position during the disassembly process of a device.

By the way, the interference verifying device shown in FIG. 2B can be configured by an information processing device (computer) shown in FIG. 23. The information processing device shown in FIG. 23 comprises a CPU (Central Processing Unit) 23, a memory 102, an input device 103, an output device 104, an external storage device 105, a medium-driving device 106, and a network connecting device 107, which are interconnected by a bus 108.

The memory 102 includes, for example, a ROM (Read Only Memory), a RAM (Random Access Memory), etc., and stores the program and data used for processing. The CPU 101 performs necessary processing by executing the program with the memory 102.

The assembly simulator 15, the interference verification unit 29, and the display controlling unit 30, which are shown in FIG. 2B, correspond to the software components written by the program, and are stored in specific program code segments within the memory 102. The working area 26 shown in FIG. 2B corresponds to a specific storage within the memory 102.

The input device 103 is, for example, a keyboard, a pointing device, a touch panel, etc., and is used for inputting a user instruction or information. The output device 104 is, for example, a display, a printing device, etc., and is used for outputting an inquiry to a user, a processing result, etc. The input device 103 corresponds to the input device 22 shown in FIG. B, while the output device 104 corresponds to the display device 21 and the printing device 23, which are shown in FIG. 2B.

The external storage device 105 is, for example, a magnetic disk device, an optical disk device, a magneto-optical disk device, etc. The above described program and data may be stored onto the external storage device 105, and may be used by being loaded into the memory 102 depending on need. Moreover, the external storage device 105 serves as the library 28 or the database for storing three-dimensional model data 32.

The medium-driving device 106 drives a portable storage medium 109, and accesses the contents stored thereon. As the portable storage medium 109, an arbitrary computer-readable storage medium such as a memory card, a floppy disk, a CD-ROM (Compact Disk- Read Only Memory), an optical disk, a magneto-optical disk, etc. may be used. The above described program and data may be stored onto the portable storage medium 109, and may be used by being loaded into the memory 102 depending on need.

The network connecting device 107 communicates with an external device via an arbitrary network (line) such as a LAN (Local Area Network), etc., and performs data conversion accompanying a communication. Additionally, the network connecting device 107 may receive the above described program and data from an external device, and the information processing device may use them by loading them into the memory 102.

Figure 24:
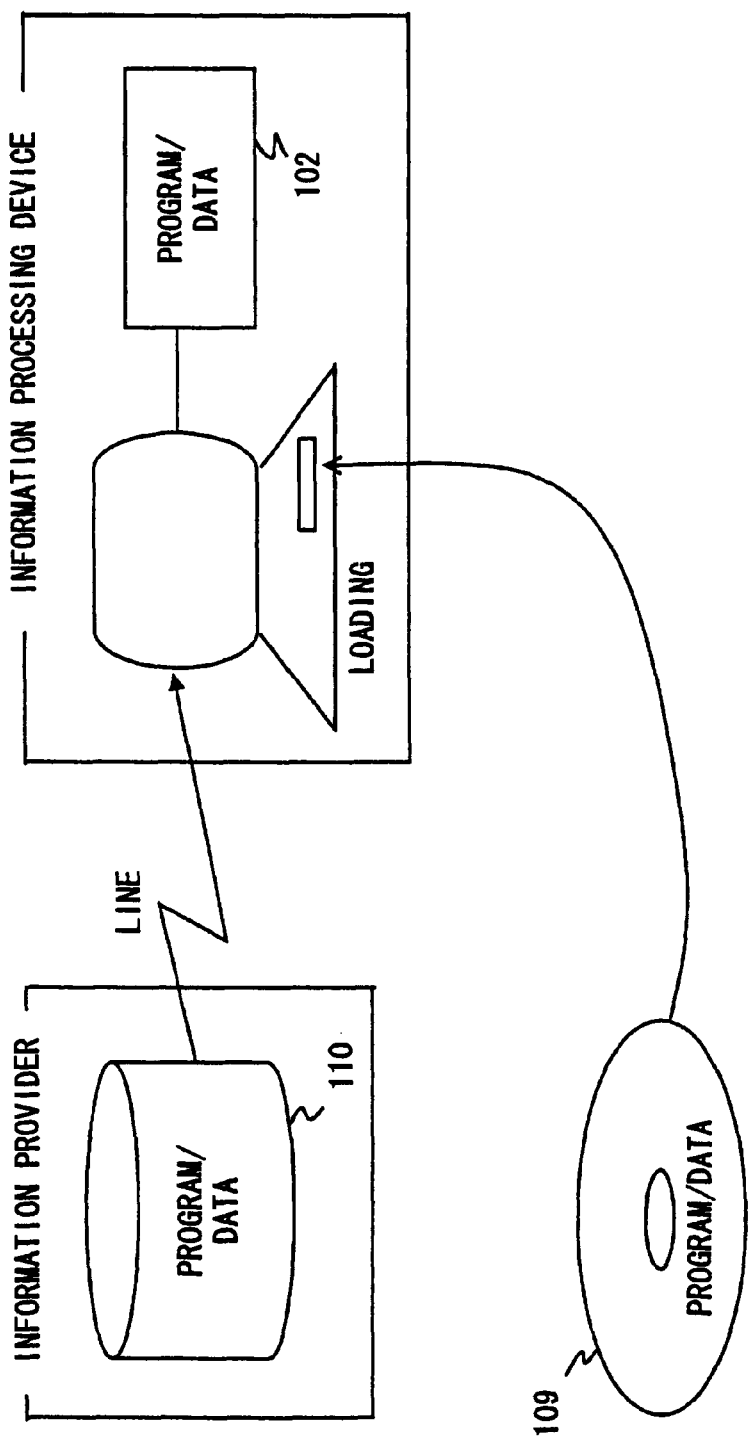
FIG. 24 shows storage media.

FIG. 24 shows computer-readable storage media which can provide the information processing device shown in FIG. 23 with a program and data. The program and the data stored onto the portable storage medium 109 or in an external database 110 are loaded into the memory 102. The CPU 101 then executes the program with the data, and performs necessary processing.

According to the present invention, whether or not the assembly/disassembly of a device can be efficiently checked by making interference verification in consideration of a change in shape of a part at a design stage of the device composed of a plurality of parts. Consequently, the accuracy of the assembly/disassembly simulation at the design stage can be improved, and the amount of redesign at a prototyping stage is reduced, thereby greatly contributing to a reduction in a product development time period.

What is claimed is:

1. An interference verifying device using a computer-aided design system for interference verification between parts in a device, comprising:
    a simulation unit simulating a positional relationship among the parts by using shape information obtained as model data, generated by the computer-aided design system, indicating shapes of the parts;
    a displaying unit displaying a simulated positional relationship among the parts on a screen;
    a storing unit storing changed shape information of at least one part of the plurality of parts beforehand, the changed shape information indicating a changed shape of the at least one part after deformation;
    a deformation unit changing a shape of the at least one part by replacing an original shape of the at least one part before deformation displayed on the screen with the changed shape of the at least one part after deformation indicated by the changed shape information; and
    a verification unit verifying an interference state among the plurality of parts based on the changed shape displayed on the screen.

2. The interference verifying device according to claim 1, wherein said displaying unit displays the changed shape of the at least one part on the screen.

3. The interference verifying device according to claim 1, wherein said deformation unit determines, when said simulation unit is moving one of the plurality of parts and the moved part comes in contact with another part on the screen, whether at least one of the two parts in contact is transformable, and extracts the changed shape information of a transformable part from said storing unit.

4. The interference verifying device according to claim 3, wherein said deformation unit restores the changed shape of the transformable part, when said simulation unit moves the moved part to the target position, to the original shape of the transformable part, and
    wherein said verification unit verifies the interference state of the plurality of parts based on the original shape.

5. The interference verifying device according to claim 1, wherein said storing unit stores a plurality of pieces of the changed shape information according to a plurality of predetermined interference conditions, and
    wherein said deformation unit selects a piece of the changed shape information corresponding to an interference condition representing a state of two parts in contact from the plurality of pieces of the changed shape information.

6. The interference verifying device according to claim 5, wherein said storing unit stores the changed shape information by using at least one item of information among a material, an interference face, and an interference direction as the predetermined interference conditions.

7. The interference verifying device according to claim 1, wherein said storing unit stores the changed shape information corresponding to at least one of elastic deformation, a change of a shape of rigid body, and plastic deformation.

8. An interference verifying device using a computer-aided design system for verifying interference between parts in an assembly process of a device, comprising:
    a simulation unit simulating a positional relationship of the parts by using shape information obtained as model data, generated by the computer-aided design system, indicating shapes of the parts;
    a displaying unit displaying a simulated positional relationship among the parts on a screen;
    a storing unit storing changed shape information of at least one part among the plurality of parts beforehand, the changed shape information indicating a changed shape of the at least one part after deformation;
    a deformation unit changing a shape of the at least one part by replacing an original shape of the at least one part before deformation displayed on the screen with the changed shape of the at least one part after deformation indicated by the changed shape information, when said simulation unit moves one of the plurality of parts on an assembly route and the at least one part comes in contact with another part on the screen; and
    a verification unit verifying an interference state among the plurality of parts based on the changed shape displayed on the screen.

9. An interference verifying device using a computer-aided design system for verifying interference between parts in a disassembly process of a device comprising:
    a simulation unit simulating a positional relationship of the parts by using shape information obtained as model data, generated by the computer-aided design system, indicating shapes of the parts;
    a displaying unit displaying a simulated positional relationship among the parts on a screen;
    a storing unit storing changed shape information of at least one part among the plurality of parts beforehand, the changed shape information indicating a changed shape of the at least one part after deformation;

a deformation unit changing a shape of the at least one part by replacing an original shape of the at least one part before deformation displayed on the screen with the changed shape of the at least one part after deformation indicated by the changed shape information, when said simulation unit moves one of the plurality of parts on a disassembly route and the at least one part comes in contact with another part on the screen; and a verification unit verifying an interference state among the plurality of parts based on the changed shape displayed on the screen.

10. An interference verifying device for interference verification using a computer-aided design system, comprising:

a simulation unit simulating positional information of first and second objects by using shape information of the first and second objects, the shape information being model data generated by the computer-aided design system and indicating shapes of the first and second objects;

a displaying unit displaying simulated positional information of the first and second objects on a screen;

a storing unit storing changed shape information of the first object beforehand, the changed shape information indicating a changed shape of the first object after deformation;

a deformation unit changing a shape of the first-object by replacing an original shape of the first object before deformation displayed on the screen with the changed shape of the first object after deformation indicated by the changed shape information, when the first object comes in contact with the second object on the screen; and a verification unit verifying an interference state between the first and second objects based on the changed shape displayed on the screen.

11. A computer-readable storage medium on which is recorded a program for causing a computer to execute a process, said process comprising:

simulating a positional relationship of a plurality of parts by using shape information obtained as model data, generated by a computer-aided design system, indicating shapes of the parts;

displaying the simulated positional relationship among the parts on a screen;

storing changed shape information of at least one part of the plurality of parts beforehand, the changed shape information indicating a changed shape of the at least one part after deformation;

moving one of the plurality of parts on the screen;

changing a shape of at least one of two parts in contact on the screen, when a moved part comes in contact with another part on the screen, replacing an original shape of the at least one of the two parts before deformation displayed on the screen with the changed shape of the at least one of the two parts after deformation indicated by changed shape information of the at least one of the two parts; and verifying an interference state among the plurality of parts based on the changed shape displayed on the screen.

12. A computer-readable storage medium on which is recorded a program for causing a computer to execute a process, said process comprising:

simulating positional information of first and second objects by using shape information of the first and second objects, the shape information being model data generated by the computer-aided design system and indicating shapes of the first and second objects;

a displaying unit displaying simulated positional information of the first and second objects on a screen;

storing changed shape information of the first object beforehand, the changed shape information indicating a changed shape of the first object after deformation;

moving the first object on the screen;

changing a shape of at least one of the first and second objects on the screen by replacing an original shape of the at least one of the first and second objects before deformation displayed on the screen with the changed shape of the at least one of the first and second objects after deformation indicated by changed shape information of the at least one of the first and second objects, when the first object comes in contact with the second object on the screen; and verifying an interference state between the first and second objects based on the changed shape displayed on the screen.

13. An interference verifying method for verifying interference between parts within a device composed of a plurality of parts, comprising:

creating changed shape information of at least one of the parts beforehand, the changed shape information indicating a changed shape of the at least one of the parts after deformation;

simulating a positional relationship between the parts by using shape information obtained as model data, generated by a computer-aided design system, indicating shapes of the parts;

displaying the simulated positional relationship among the parts on a screen;

moving one of the plurality of parts on the screen;

changing a shape of at least one of two parts in contact on the screen, when a moved part comes in contact with another part on the screen, by replacing an original shape of the at least one of the two parts before deformation displayed on the screen with the changed shape of the at least one of the two parts after deformation indicated by changed shape information of the at least one of the two parts; and verifying an interference state among the plurality of parts based on the changed shape displayed on the screen.

14. An interference verifying method, comprising:

creating changed shape information of at least one of first and second objects beforehand, the changed shape information indicating a changed shape of the at least one of the first and second objects after deformation;

simulating a positional relationship between the first and second objects using the shape information of the first and second objects, the shape information being model data generated by a computer-aided design system and indicating shapes of the first and second objects;

displaying simulated positional information of the first and second objects on a screen;

moving the first object on the screen;

changing a shape of at least one of the first and second objects on the screen by replacing an original shape of the at least one of the first and second objects before deformation displayed on the screen with the changed shape of the at least one of the first and second objects after deformation indicated by changed shape information of the at least one of the first and second objects, when the first object comes in contact with the second object on the screen; and verifying an interference state between the first and second objects based on the changed shape displayed on the screen.

15. An interference verifying device for interference verification between parts in a device using a computer-aided design system, comprising:

simulation means for simulating a positional relationship among the plurality of parts by using shape information obtained as model data, generated by a computer-aided design system, indicating shapes of the parts;

display means for displaying simulated positional information among the parts on a screen;

storing means for storing changed shape information of at least one part of the plurality of parts beforehand, the changed shape information indicating a changed shape of the at least one part after deformation;

deformation means for changing a shape of the at least one part by replacing an original shape of the at least one part before deformation displayed on the screen with the changed shape of the at least one part after deformation indicated by the changed shape information; and verification means for verifying an interference state among the plurality of parts based on the changed shape displayed on the screen.

16. An interference verifying device, comprising:

simulation means for simulating positional information of first and second objects by using shape information of the first and second objects, the shape information being model data generated by a computer-aided design system and indicating shapes of the first and second objects;

display means for displaying simulated positional information of the first and second objects on a screen;

storing means for storing changed shape information of the first object beforehand, the changed shape information indicating a changed shape of the first object after deformation;

deformation means for changing a shape of the first object by replacing an original shape of the at least one part before deformation displayed on the screen with the changed shape of the first object after deformation indicated by the changed shape information, when the first object comes in contact with the second object on the screen; and verification means for verifying an interference state between the first and second objects based on the changed shape displayed on the screen.

* * * * *